US008621847B2

(12) United States Patent
Gonze et al.

(10) Patent No.: US 8,621,847 B2
(45) Date of Patent: Jan. 7, 2014

(54) ENGINE OFF NH₃ BASED SELECTIVE CATALYTIC REDUCTION NO$_X$ ADSORBER

(75) Inventors: Eugene V. Gonze, Pinckney, MI (US); Michael J. Paratore, Jr., Howell, MI (US); Chang H. Kim, Rochester, MI (US); Steven J. Schmieg, Troy, MI (US)

(73) Assignee: GM Global Technology Operations LLC

( * ) Notice: Subject to any disclaimer, the term of this patent is extended or adjusted under 35 U.S.C. 154(b) by 269 days.

(21) Appl. No.: 13/242,811

(22) Filed: Sep. 23, 2011

(65) Prior Publication Data

US 2013/0074474 A1 Mar. 28, 2013

(51) Int. Cl.
*F01N 3/00* (2006.01)
(52) U.S. Cl.
USPC ............... 60/286; 60/287; 60/289; 60/295; 60/299; 60/301

(58) Field of Classification Search
USPC ............................ 60/287, 289, 295, 299, 301
See application file for complete search history.

(56) References Cited

U.S. PATENT DOCUMENTS 7,264,785 B2 * 9/2007 Blakeman et al. .......... 423/213.2
2011/0061370 A1 * 3/2011 Aoyama et al. ................. 60/285

* cited by examiner

*Primary Examiner* — Thomas Denion
*Assistant Examiner* — Philip Eklem

(57) ABSTRACT

An exhaust treatment system for an engine includes a selective catalyst reduction (SCR) treatment module that controls a valve and an air pump to deliver air to an SCR catalyst in response to the engine turning off. An SCR loading module controls the valve and the air pump to deliver air to an exhaust manifold and controls a dosing system to deliver a dosing agent upstream of the SCR catalyst when a temperature of the SCR catalyst is less than a temperature threshold and the SCR catalyst is not saturated with ammonia.

17 Claims, 3 Drawing Sheets

US 8,621,847 B2

ENGINE OFF NH₃ BASED SELECTIVE CATALYTIC REDUCTION NOₓ ADSORBER

FIELD

The present disclosure relates to exhaust treatment systems and, more particularly, to engine off ammonia (NH₃) selective catalytic reduction (SCR) nitrogen oxide (NOₓ) adsorption systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A selective catalytic reduction (SCR) catalyst may be used to reduce emissions in an engine. In an SCR process, nitrogen oxide (NOₓ) reacts with a reductant that is injected by a dosing system into an exhaust stream. The reductant is adsorbed onto the SCR catalyst. The injected dosing agent (e.g., urea) decomposes to form ammonia (NH₃). The NH₃ is the reductant utilized to react with the NOₓ, reducing it to nitrogen (N₂) and water (H₂O).

The SCR process typically requires relatively high exhaust temperatures (e.g., greater than 200° C.). At cold start and at low load operating conditions, engines may generate exhaust with cool exhaust temperatures (e.g., below 200° C.). Accordingly, during a cold start phase the highest temperature of the SCR catalyst may be lower than the temperature required to make the SCR catalyst active in reducing NOₓ emission.

SUMMARY

An exhaust treatment system for an engine includes a selective catalyst reduction (SCR) treatment module that controls a valve and an air pump to deliver air to an SCR catalyst in response to the engine turning off. An SCR loading module controls the valve and the air pump to deliver air to an exhaust manifold and controls a dosing system to deliver a dosing agent upstream of the SCR catalyst when a temperature of the SCR catalyst is less than a temperature threshold and the SCR catalyst is not saturated with ammonia.

In other features, a method of operating an exhaust treatment system for an engine includes controlling a valve and an air pump to deliver air to an SCR catalyst in response to the engine turning off. The method includes controlling the valve and the air pump to deliver air to an exhaust manifold. The method includes controlling a dosing system to deliver a dosing agent upstream of the SCR catalyst when a temperature of the SCR catalyst is less than a temperature threshold and the SCR catalyst is not saturated with ammonia.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
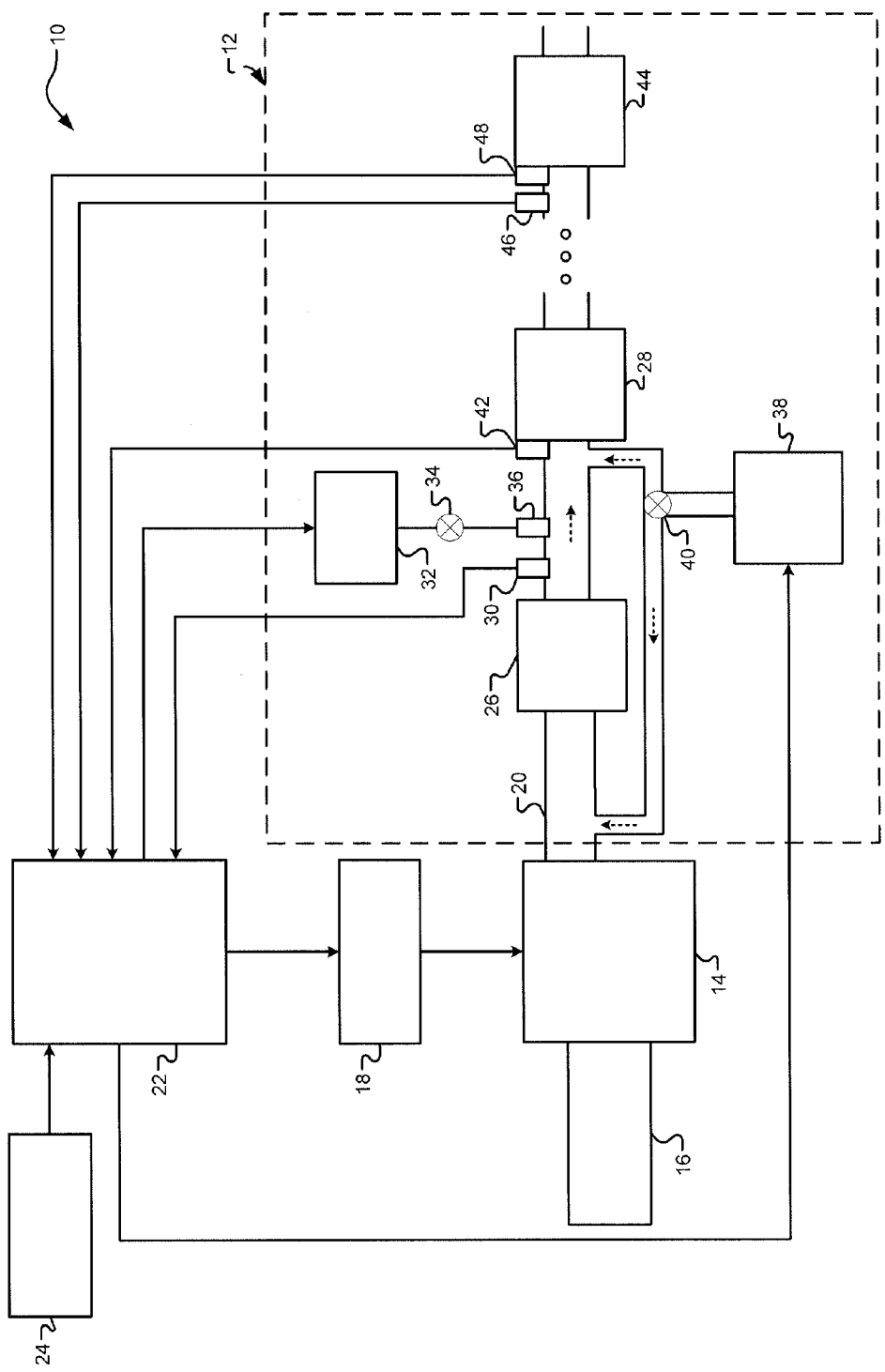
FIG. 1 is a functional block diagram of an example vehicle system including an exhaust treatment system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations such as multiple servers in a parallel processing arrangement. In addition, some or all code from a single module may be stored using a group of memories.

An exhaust treatment system according to the present disclosure includes an air pump with an air valve, a three-way catalyst (TWC) with palladium-containing perovskite-based and/or platinum containing alumina-based catalysts, a dosing injector, a temperature sensor, and a NOₓ sensor disposed upstream from a selective catalyst reduction (SCR) catalyst. During an engine start-up period, the TWC converts NO to NO₂ at a temperature less than the reduction temperature. The SCR catalyst is not able to effectively reduce the NO₂ into N₂ and H₂O during the engine start-up period. Instead, the SCR catalyst stores NO₂ during the engine start-up period. Ammonia (NH₃) reduces the NO₂ to nitrogen (N₂) and water (H₂O) after the reduction temperature is exceeded.

The SCR catalyst may store more NH₃ at a predetermined storage temperature than at the reduction temperature. The predetermined storage temperature is less than the reduction temperature. For example, the reduction temperature may be about 200° C., and the predetermined storage temperature may be about 150° C. When the engine is shut down, the air valve diverts ambient air from the air pump to the SCR catalyst. When the SCR catalyst cools to less than the predetermined storage temperature, the air valve diverts the ambient air through the engine exhaust. The engine, the TWC, and an exhaust manifold heat the ambient air. The heated air has a temperature at least as high as the reduction temperature. The air pump delivers the heated air and dosing agent from the dosing injector to the SCR catalyst.

The dosing agent decomposes in the heated air to become two molecules of $NH_3$ for every molecule of the dosing agent in the presence of water. The SCR catalyst adsorbs the $NH_3$. When the SCR catalyst is saturated with $NH_3$, the air pump turns off. The $NH_3$ stored on the SCR catalyst increases the capacity of the SCR catalyst to reduce $NO_x$ after a cold start. Accordingly, the storage of $NH_3$ on the SCR catalyst provides improved emissions without using additional fuel.

Referring to FIG. 1, an example of a vehicle system 10 including an exhaust treatment system according to the present disclosure is shown. Air is provided to an engine 14 through an air intake system 16. A fuel delivery system 18 provides fuel to the engine 14. Exhaust is produced through the combustion process and is expelled from the engine 14 into an exhaust manifold 20. The exhaust treatment system 12 receives the exhaust from the engine 14 through the exhaust manifold 20 and treats the exhaust to reduce $NO_x$ before the exhaust is released into the atmosphere.

A control module 22 communicates with an engine on/off sensor 24. The engine on/off sensor 24 may be any device indicating a difference in a signal when the engine 14 is on or off. For example only, the engine on/off sensor 24 may be an ignition voltage shut off sensor or an engine speed sensor. The control module 22 determines when the engine 14 is off based on the signal from the engine on/off sensor 24. The control module 22 operates the exhaust treatment system 12 based on the engine on/off sensor 24 and one or more other sensors within the exhaust treatment system 12.

The exhaust treatment system 12 includes a three-way catalyst (TWC) 26 and a first selective catalytic reduction (SCR) catalyst 28. The TWC 26 oxidizes hydrocarbons in the exhaust upstream of the first SCR catalyst 28. The TWC 26 enhances $NO_x$ adsorption efficiency at low temperatures by partially converting NO contained in the exhaust into $NO_2$.

A dosing system 32 with a dosing valve 34 and a dosing injector 36 is provided upstream of the first SCR catalyst 28. The dosing injector 36 injects the dosing agent into the exhaust stream. An air pump 38 with an air valve 40 is arranged such that the air valve 40 allows the air to be provided into the exhaust manifold 20 or between the dosing system 32 and the first SCR catalyst 28. The dosing system 32 adds the dosing agent to the exhaust stream. The heated air decomposes the dosing agent into $NH_3$. The $NH_3$ adsorbs onto the first SCR catalyst 28.

A first $NO_x$ sensor 30 is provided upstream of the first SCR catalyst 28 and downstream of the TWC 26. The first $NO_x$ sensor 30 is immediately upstream of the first SCR catalyst 28 and provides a $NO_x$ signal to the control module 22. A first SCR temperature sensor 42 is immediately upstream of the first SCR catalyst 28 and provides a temperature signal to the control module 22. The temperature signal indicates a temperature of the first SCR catalyst 28.

The first SCR catalyst 28 removes nitrogen oxides ($NO_x$) in the exhaust through a chemical reaction between the exhaust, the reductant, and a catalyst on the first SCR catalyst 28. The heated air causes the dosing agent to decompose into $NH_3$ and hydro-cyanic acid (HNCO). The HNCO further decomposes (e.g., hydrolizes) in the presence of the reduction temperature into water and $NH_3$. The $NH_3$ adsorbs onto the first SCR catalyst 28. The adsorbed $NH_3$ reacts with $NO_x$ in the exhaust to form $H_2O$ and $N_2$. The first SCR catalyst 28 may effectively convert $NO_x$ into $H_2O$ and $N_2$ at a reduction temperature. The reduction temperature may depend on a number of factors, including but not limited to, the first SCR catalyst 28 composition and density, sizes of the canisters for the TWC 26, and/or fuel composition. The reduction temperature may be, for example only, about 200° C.

Additionally, the first SCR catalyst 28 may store more $NH_3$ as the temperature of the first SCR catalyst 28 is lowered. After the engine 14 turns off, the control module 22 activates an air pump 38 and opens the air valve 40. The air pump 38 provides ambient air to the first SCR catalyst 28, lowering the temperature of the first SCR catalyst 28.

When the temperature of the first SCR catalyst 28 is less than the predetermined storage temperature, the control module 22 directs the air valve 40 and the air pump 38 to provide ambient air through the exhaust manifold 20 to the first SCR catalyst 28. The ambient air is heated by air from the engine 14 and the exhaust manifold 20. The heated air has a temperature greater than the reduction temperature. The control module 22 directs the dosing system 32 to provide the dosing agent to the heated air. The heated air is hot enough to allow the dosing agent to decompose into $NH_3$ and HNCO, and to allow the HNCO in the presence of water to further decompose into $NH_3$ and $CO_2$. The $NH_3$ is absorbed by the first SCR catalyst 28, increasing the capacity of the SCR catalyst to reduce $NO_x$ after a cold start. The air pump 38 stops providing the heated air and the dosing system 32 stops providing the dosing agent when the first SCR catalyst 28 is saturated with $NH_3$ and/or the dosing agent does not decompose.

After the cold start, the stored $NH_3$ allows more $NO_2$ storage on the first SCR catalyst 28. When the reduction temperature is met, the stored $NH_3$ and the stored $NO_x$ may be reduced to $N_2$ and $H_2O$. It may be appreciated that a plurality (e.g., n) of SCR catalysts in series may also be used. An nth SCR catalyst 44 with an nth $NO_x$ sensor 46 and an nth SCR temperature sensor 48 is shown. The nth $NO_x$ sensor 46 and the nth SCR temperature sensor 48 communicate with the control module 22. When the engine 14 is on, the nth SCR catalyst 44 has a lower temperature than the first SCR catalyst 28. When the first SCR catalyst 28 has a temperature less than the predetermined temperature, the nth SCR catalyst 44 may store $NH_3$.

The $NO_x$ signals received from the $NO_x$ sensors 30 and 46 may indirectly indicate the concentration of the $NH_3$ in the first SCR catalyst 28. For example, because the amount of the dosing agent injected (and other measured values such as the $NO_x$ sensed before and after the SCR 28) is known, the concentration of the $NH_3$ in the first SCR catalyst 28 may be determined. For example only, the concentration of the $NH_3$ may be modeled or estimated based on the amount of the dosing agent injected and the signals provided by the $NO_x$ sensors 30 and 46.

Figure 2:
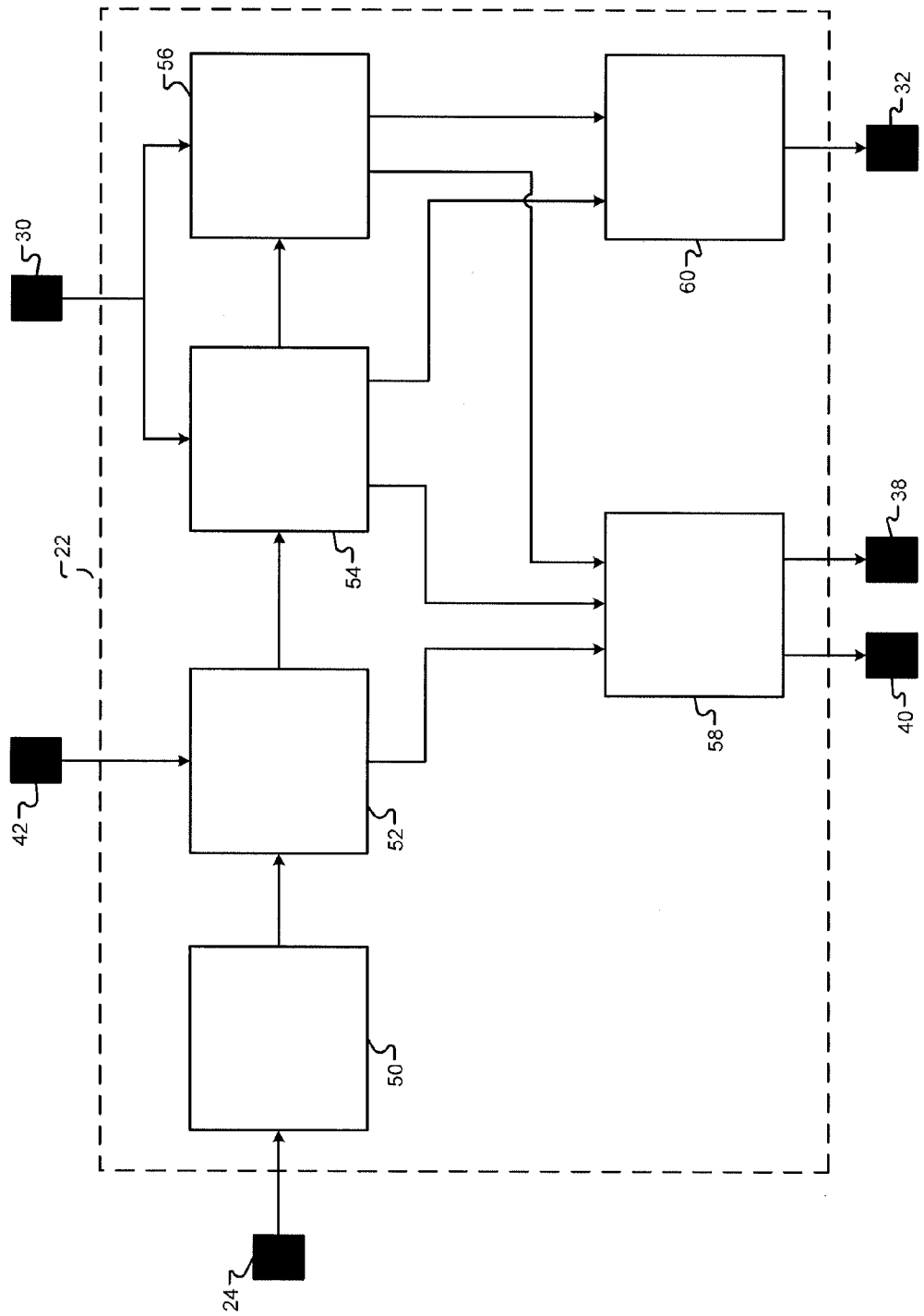
FIG. 2 is a functional block diagram of an example control module in accordance with the present disclosure.

Referring to FIG. 2, a functional block diagram of an example control module 22 is shown. The control module 22 includes an engine off determination module 50, an SCR treatment module 52, an SCR loading module 54, a decomposition determination module 56, an air control module 58, and a dosing control module 60.

The engine off determination module 50 generates an engine off indicator based on an engine on/off signal from the engine on/off sensor 24. The engine off indicator indicates when the engine 14 turns off. When the engine 14 turns off, the engine off determination module 50 generates the engine off indicator. The engine off determination module 50 provides the engine off indicator to the SCR treatment module 52.

The SCR treatment module 52 generates a storage temperature indicator based on a temperature signal from the first SCR temperature sensor 42 and the predetermined storage temperature. When the engine 14 is off, the SCR treatment module 52 generates a storage temperature indicator based on the temperature signal and the predetermined storage temperature. The storage temperature indicator indicates whether the temperature of the first SCR catalyst 28 is less than the predetermined storage temperature.

The SCR loading module 54 generates an $NH_3$ saturation indicator based in part on the $NO_x$ signals. For example, as described above in FIG. 1, the $NO_x$ signals in combination with the amount of dosing agent injected and/or other variables may indicate the $NH_3$ present in the first SCR catalyst 28. The $NH_3$ saturation indicator indicates the saturation of the reductant onto the first SCR catalyst 28. The SCR loading module 54 may compare the $NH_3$ present in the first SCR catalyst 28 to a saturation value. The saturation value may correspond to the $NH_3$ present in the first SCR catalyst 28, which is saturated. The saturation value depends on a number of factors, including, but not limited to, the first SCR catalyst 28 composition, density, and size.

The decomposition determination module 56 generates a decomposition indicator based on a plurality of the $NO_x$ signals. The decomposition indicator indicates whether the dosing agent is decomposing into $NH_3$ and $CO_2$. The decomposition determination module 56 compares a plurality of $NO_x$ signals over a predetermined time period to determine whether the dosing agent is decomposing. For example, the decomposition determination module 56 may determine that the reductant does is not decomposing when there is no increase of $NH_3$ after the dosing agent is added.

The air control module 58 controls the air pump 38 and the air valve 40 based on the storage temperature indicator, the $NH_3$ saturation indicator, and the decomposition indicator. The air control module 58 activates the air pump 38 and directs the air valve 40 to deliver ambient air to the first SCR catalyst 28 when the storage temperature indicator indicates that the temperature of the first SCR catalyst 28 is greater than the predetermined storage temperature. The air control module 58 activates the air pump 38 and directs the air valve 40 to deliver engine air into the exhaust when the storage temperature indicator indicates that the temperature of the first SCR catalyst 28 is less than the predetermined storage temperature. The air control module 58 turns off the air pump 38 when the decomposition indicator indicates the reductant is not reduced and/or the $NH_3$ saturation indicator indicates the first SCR catalyst 28 is saturated.

The dosing control module 60 controls the dosing system 32 based on the $NH_3$ saturation indicator and the decomposition indicator. The dosing control module 60 commands delivery of the dosing agent when the decomposition indicator indicates that the dosing agent is reduced and the $NH_3$ saturation indicator indicates that the first SCR catalyst 28 is not saturated. For example, the dosing control module 60 may activate the dosing system when the dosing agent decomposes and the first SCR catalyst 28 is not saturated.

Figure 3:
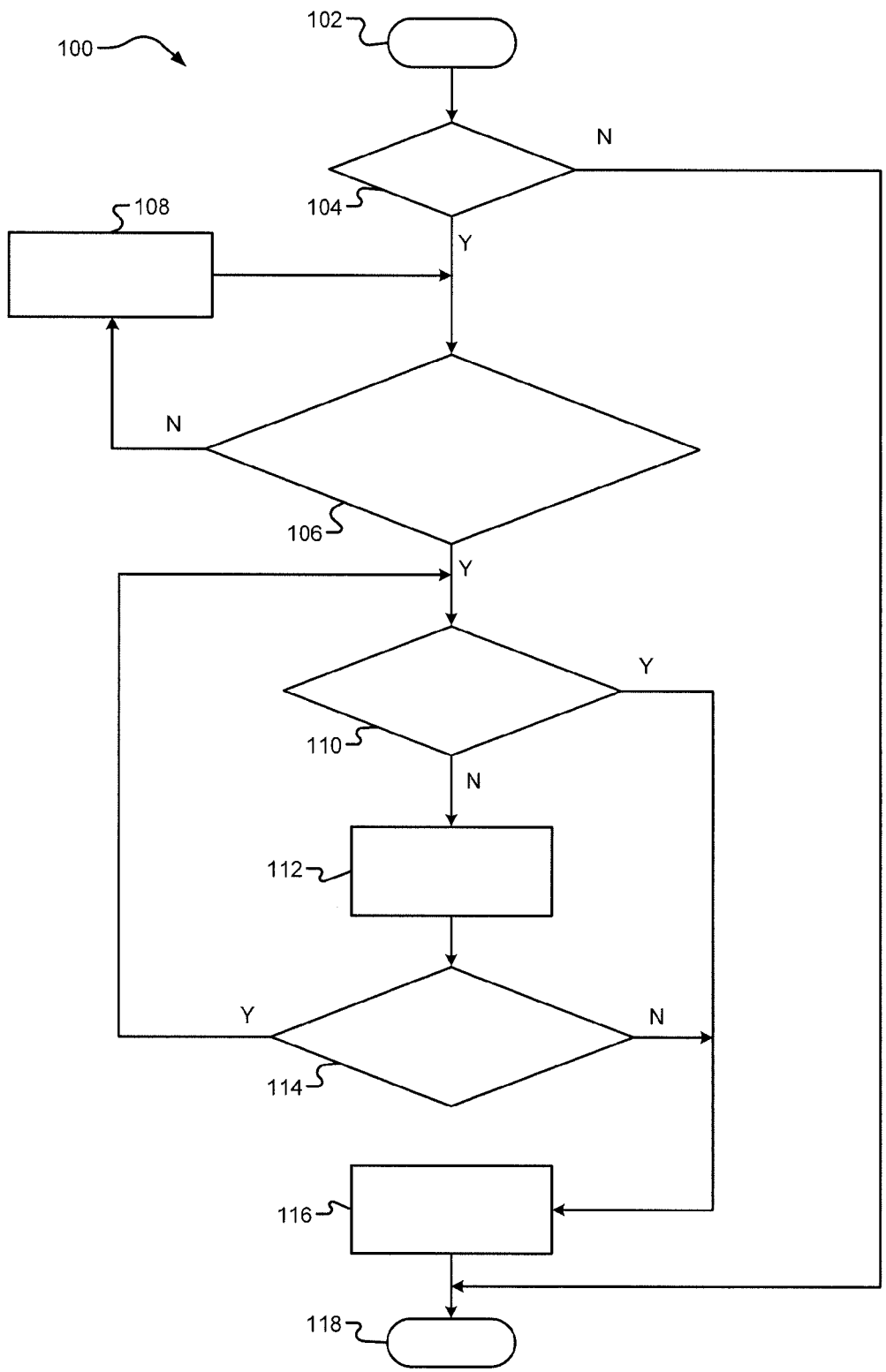
FIG. 3 is a flow diagram of an example method of operating an exhaust treatment system in accordance with the present disclosure.

Referring to FIG. 3, flow chart depicting an example method 100 of operating the exhaust treatment system 12 is shown. The method 100 begins at 102. At 104, the method 100 determines whether the engine 14 is off. If no, the method 100 ends at 118. If yes, the method 100 proceeds to 106. At 106, the method 100 determines whether the temperature of the first SCR catalyst 28 is less then the predetermined storage temperature. If no, the method 100 proceeds to 108. If yes, the method 100 proceeds to 110. At 108, the method 100 activates the air pump 38 and the air valve delivers ambient air to the first SCR catalyst 28. At 110, the method 100 determines whether the first SCR catalyst 28 is saturated with $NH_3$. If yes, the method 100 proceeds to 116. If no, the method 100 proceeds to 112. At 112, the method 100 diverts air from the air pump 38 to the engine exhaust and injects the dosing agent into the exhaust. At 114, the method 100 determines whether the dosing agent is decomposing. If no, the method 100 proceeds to 116. If yes, the method 100 returns to 110. At 116, the method 100 turns the air pump off and ends at 118.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust treatment system for an engine, comprising:
a first electronic circuit configured to control a valve and an air pump to deliver air via a first path to an SCR catalyst in response to i) the engine turning off and ii) a temperature of the SCR catalyst being greater than a temperature threshold; and
a second electronic circuit configured to, after delivering air via the first path to the SCR catalyst, control the valve and the air pump to divert air from the first path to a second path to deliver air to an exhaust manifold and control a dosing system to deliver a dosing agent upstream of the SCR catalyst in response to i) the temperature of the SCR catalyst being less than the temperature threshold and ii) the SCR catalyst not being saturated with ammonia.

2. The exhaust treatment system of claim 1 further comprising a third electronic circuit configured to control the valve and the air pump to deliver air to the exhaust manifold and control the dosing system to deliver the dosing agent upstream of the SCR catalyst when the temperature of the SCR catalyst is less than the temperature threshold and the dosing agent is decomposing.

3. The exhaust treatment system of claim 2 wherein the third electronic circuit is configured to determine whether the dosing agent is decomposing based on a plurality of $NO_x$ signals.

4. The exhaust treatment system of claim 2 wherein the third electronic circuit is configured to control the valve and the air pump to deactivate when the dosing agent is not decomposing.

5. The exhaust treatment system of claim 1 wherein the first electronic circuit is configured to delay the response to the engine turning off.

6. The exhaust treatment system of claim 1 wherein the second electronic circuit is configured to determine whether the SCR catalyst is not saturated with ammonia based on a $NO_x$ signal.

7. The exhaust treatment system of claim 1 wherein the temperature threshold is lower than a reduction temperature of the SCR catalyst.

8. The exhaust treatment system of claim 1 wherein the first electronic circuit is configured to control delivery of air to the SCR catalyst based on the temperature of the SCR catalyst.

9. The exhaust treatment system of claim 1 wherein the second electronic circuit is configured to control the valve and the air pump to deactivate when the SCR catalyst is saturated with ammonia.

10. A method of operating an exhaust treatment system for an engine, comprising:
controlling a valve and an air pump to deliver air via a first path to an SCR catalyst in response to i) the engine turning off and ii) a temperature of the SCR catalyst being greater than a temperature threshold; and after controlling the valve and the air pump to deliver air via the first path to the SCR catalyst, controlling the valve and the air pump to divert air from the first path to a second path to deliver air to an exhaust manifold and controlling a dosing system to deliver a dosing agent upstream of the SCR catalyst in response to the temperature of the SCR catalyst being less than the temperature threshold and the SCR catalyst not being saturated with ammonia.

11. The method of claim 10 further comprising:

controlling the dosing system to deliver the dosing agent upstream of the SCR catalyst when the temperature of the SCR catalyst is less than the temperature threshold and the dosing agent is decomposing.

12. The method of claim 11 further comprising determining whether the dosing agent is decomposing based on a plurality of $NO_x$ signals.

13. The method of claim 11 further comprising deactivating the air pump when the dosing agent is not decomposing.

14. The method of claim 10 further comprising delaying the response to the engine turning off.

15. The method of claim 10 further comprising:

determining whether the SCR catalyst is saturated based on a $NO_x$ signal; and deactivating the air pump when the SCR catalyst is saturated with ammonia.

16. The method of claim 10 wherein the temperature threshold is lower than a reduction temperature of the SCR catalyst.

17. The method of claim 10 further comprising controlling delivery of air to the SCR catalyst based on a temperature of the SCR catalyst.

* * * * *